UNITED STATES PATENT OFFICE.

ALCIDE FRANÇOIS POIRRIER, OF PARIS, FRANCE.

SULFURETED DYE.

SPECIFICATION forming part of Letters Patent No. 561,276, dated June 2, 1896.

Application filed March 21, 1895. Serial No. 542,694. (No specimens.) Patented in France June 30, 1894, No. 239,714.

*To all whom it may concern:*

Be it known that I, ALCIDE FRANÇOIS POIRRIER, of Paris, France, have invented certain new and useful Improvements in the Manufacture of Coloring-Matters termed "Thiocatechines," which improvements are described in the following specification, and for which I have obtained French Patent No. 239,714, dated June 30, 1894.

It is known that by the action of sulfur alone or of sulfur and caustic alkalies on simple or complex organic substances a certain number of coloring-matters are obtained. Among them the coloring-matters described in the specification of English Patent No. 1,489 of 1893, denoted by the generic name "cachou de Laval," are obtained by causing sulfur and caustic soda to react on organic bodies of simple or complex character, such as sawdust, bran, wool, pyrogallol, and certain organic acids. Kopp has obtained (see *Berichte*, VII, 1746) coloring-matters of the same nature by heating dry acetate of soda with sulfur to a very high temperature.

In United States Patents Nos. 532,484 and 532,503, granted January 15, 1895, the same use of sulfur and caustic soda is disclosed and the same condition or reaction, but applied to aromatic combinations of known properties, such as dioxybenzenes, paradiamins, or amidophenols. The coloring-matters obtained in those three cases have the same reactions, the same characters, and are capable of the same applications. They differ only in the tints which they produce on vegetable fibers. While cachou de Laval dyes gray brown, the coloring-matters of the United States patents referred to dye black and blue. Further, it is known that if sulfur alone is heated with aromatic monanims—such as paratoluidin or alpha-metaxylidin, in which is a group $CH_3$ para in relation to the amido group—basic matters are obtained capable of dying unmordanted cotton yellow tints. (See *Berichte*, XXII, 330, 422, 968.) These bodies, the nature of which is now well settled, are termed "primulins, dehydrothiotoluidin, dehydrothio xylidin," &c. Finally, it is also known that by heating, under certain conditions, hydrosulfate of ammonia, with substituted aromatic diamins, such as paraphenylenediamin dimethylated, a blue coloring-matter, "methylin blue," has been obtained according to the German Patent No. 18,579. On the other hand, I have found that by making sulfur, or preferably sulfur and caustic soda or alkaline sulfids, react on these same paradiamins, simple or acetylated, under special conditions as to fusion and the state of the reagents which are together, there are obtained new coloring-matters very different from those above referred to, in respect not only of their chemical properties but also of the tints which they produce on fibers. They dye unmordanted cotton in tints varying from yellow to brown or red yellow, having remarkable luster and fast against various chemical agents. The following examples illustrate the process for their preparation.

Example I: I heat to 200° to 250° centigrade for three hours one hundred kilos acetyl-paraphenylenediamin and two hundred kilos sulfur. There shortly occurs a violent reaction and evolution of sulfureted hydrogen, on the cessation of which the material is left to cool. The coloring-matter obtained is soluble in hot alkaline sulfids, and in this condition directly dyes cotton a brown yellow.

Example II: I heat to about 300° centigrade for three to four hours one hundred kilos diacetyldiazobenzidin, one hundred kilos dry sodium sulfite, and two hundred kilos sulfur. When the reaction is complete, the material is allowed to cool and can in this conditon be applied to use. The coloring-matter, which is readily soluble in water, dyes cotton yellow.

Analogous coloring-matters may be prepared by heating under like conditions acetyl-paranitranilin, the nitrotoluidins and nitro-alpha-naphthylamin, acetylated, or the corresponding amido derivatives. All these coloring-matters have the same properties. They are soluble in water, in alkaline sulfids, sulfites, and bisulfites, insoluble in acids. It is known, on the other hand, that the primulins and dehyrothiotoluidins or xylidins are basic bodies insoluble in alkalies.

The combination of the new products with alkaline bisulfites has little stability, and even at 100° centigrade it reproduces the primary material. The solutions in alkaline sulfids are brown, thus differing essentially from cachou de laval and also from the coloring-matters of the United States patents mentioned above, which possess the common property of dissolving in sodium sulfid with characteristic bottle-green color.

The ordinary reducing agents do not attack the new coloring-matters. It is only at boiling-point that zinc powder discolors the alkaline solutions by oxidation or reproduces the primary coloring-matter. Finally, as has been shown, vegetable fibers are dyed directly in fast tints, yellow, brown, and red yellow. It is necessary to pass the material through an oxidizing bath (bichromate, iron perchlorid, or alkaline hypochlorite) in order to brighten the tints and definitely fix the dyes.

The coloring-matters obtained as above set forth and which are termed "thiocatechins" are products insoluble in acids, soluble only in alkalies and alkaline sulfids. On precipitating them from their solution in soda or sodium sulfid by dilute acid there is obtained a paste which in contact with alkaline sulfites or bisulfites becomes soluble and may be used in this condition or after drying directly for dyeing or with addition of a thickener for printing.

Example: The coloring-matter obtained by heating amidoacetanilid with sodium sulfid and sulfur is dissolved in hot water and precipitated by dilute hydrochloric acid. The precipitated coloring-matter is filtered and washed with a little acidulated water. To the paste are then added four parts crystallized sulfite of soda for each one part of the dry product, and the whole is intimately mixed. This mixture is heated to 30° to 40° centigrade for two or three days until the whole becomes quite soluble. It may be dried and applied for use. For the sulfite of soda an equivalent quantity of bisulfite may be substituted.

Where mention is made in the following claims of a single substance, it is to be understood that the equivalents thereof are included. Thus where heating with sulfur is mentioned the intention is to include not only the use of sulfur alone, but the alternative process of using sulfur with alkaline sulfids.

Having thus described my invention, what I claim is—

1. The described process of preparing coloring-matters which dye unmordanted cotton in tints varying from yellow to brown and red brown, by heating to the prescribed temperatures, with sulfur or sulfur compounds, acetylated paradiamins, as herein set forth.

2. The described process of preparing coloring-matters which dye unmordanted cotton in tints varying from yellow to brown and red brown, by heating to the prescribed temperatures, with sulfur or sulfur compounds, acetylated paradiamins, and acting on the product of this reaction with sodium sulfite, as herein set forth.

3. The coloring-matters known as "thiocatechins," derived from acetylated paradiamins in the manner herein set forth, said coloring-matters dyeing unmordanted cotton in tints varying from yellow to brown, being soluble in water and alkaline solution, insoluble in acids and characterized by dissolving brown in alkaline sulfids.

In witness whereof I have hereunto signed my name in the presence of two subscribing witnesses.

ALCIDE FRANÇOIS POIRRIER.

Witnesses:
JULES ARMENGAUD, Jeune,
CLYDE SHROPSHIRE.